US012169878B2

(12) United States Patent
Nevdahs et al.

(10) Patent No.: US 12,169,878 B2
(45) Date of Patent: Dec. 17, 2024

(54) MULTI-LEVEL PREMISE MAPPING WITH CAMERA DRONE

(71) Applicant: Alarm.com Incorporated, Tysons, VA (US)

(72) Inventors: Ilja Nevdahs, Carnikava (LV); Agris Kipurs, Jelgava (LV)

(73) Assignee: Alarm.com Incorporated, Tysons, VA (US)

( * ) Notice: Subject to any disclaimer, the term of this patent is extended or adjusted under 35 U.S.C. 154(b) by 181 days.

(21) Appl. No.: 17/478,018

(22) Filed: Sep. 17, 2021

(65) Prior Publication Data

US 2022/0005236 A1  Jan. 6, 2022

Related U.S. Application Data

(63) Continuation of application No. 16/819,949, filed on Mar. 16, 2020, now Pat. No. 11,127,170.

(60) Provisional application No. 62/819,091, filed on Mar. 15, 2019, provisional application No. 62/819,167, filed on Mar. 15, 2019.

(51) Int. Cl.
*G06T 11/00* (2006.01)
*G06V 20/17* (2022.01)

(52) U.S. Cl.
CPC .......... *G06T 11/00* (2013.01); *G06T 2210/04* (2013.01)

(58) Field of Classification Search
CPC ................................ G06T 11/00; G06V 20/17
See application file for complete search history.

(56) References Cited

U.S. PATENT DOCUMENTS

| 9,717,387 | B1 | 8/2017 | Szatmary et al. |
| 11,175,147 | B1 | 11/2021 | Olmstead et al. |
| 2006/0124366 | A1* | 6/2006 | Le Masne De Chermont ............ B62D 55/075 180/9.3 |
| 2013/0185632 | A1* | 7/2013 | Damera-Venkata ........................ G06F 40/186 715/243 |
| 2015/0127259 | A1* | 5/2015 | Kazemipur ............... G01S 5/16 701/541 |

(Continued)

FOREIGN PATENT DOCUMENTS

| CN | 108196575 | 11/2020 |
| EP | 2927771 | 10/2015 |

OTHER PUBLICATIONS

Chowdhary et al., "GPS-Denied Indoor and Outdoor Monocular Vision Aided Navigation and Control of Unmanned Aircraft," Journal of Field Robotics, 2013, 45 pages.

(Continued)

*Primary Examiner* — Yi Yang
(74) *Attorney, Agent, or Firm* — Fish & Richardson P.C.

(57) ABSTRACT

A drone is used to map difficult transition spaces within buildings such as staircases between different levels of a multi-level building. The mapping technique used may vary based on the type of building space. For instance, for linear staircases, an orthogonal trajectory path or a smooth trajectory path may be used to map the transition space. The orthogonal trajectory path and the smooth trajectory path may be derived, at least in part, on initial and terminating points provided by a user. For circular staircases, a user may move the drone from the initial point to the terminating point, and the drone may determine a trajectory path based on the user's movement of the drone from the initial point to the terminating point.

16 Claims, 6 Drawing Sheets

(56) References Cited

U.S. PATENT DOCUMENTS

| | | |
|---|---|---|
| 2015/0312774 A1 | 10/2015 | Lau |
| 2016/0031497 A1 | 2/2016 | Luo et al. |
| 2016/0321503 A1* | 11/2016 | Zhou .................... B64C 39/024 |
| 2017/0225321 A1 | 8/2017 | Deyle et al. |
| 2019/0236732 A1 | 8/2019 | Speasl et al. |
| 2019/0375102 A1 | 12/2019 | Wang et al. |
| 2020/0033890 A1* | 1/2020 | Sugaki ................... G01C 21/26 |

OTHER PUBLICATIONS

Office Action in U.S. Appl. No. 16/819,949, dated Feb. 18, 2021, 13 pages.

* cited by examiner

MULTI-LEVEL PREMISE MAPPING WITH CAMERA DRONE

CROSS-REFERENCE TO RELATED APPLICATIONS

This application is a continuation of U.S. application Ser. No. 16/819,949, filed Mar. 16, 2020, which claims the benefit of U.S. Application No. 62/819,167, filed Mar. 15, 2019, and U.S. Patent Application No. 62/819,091, filed on Mar. 15, 2019. The complete disclosures of all of the above patent applications are hereby incorporated by reference in their entirety for all purposes.

TECHNICAL FIELD

This specification generally relates to mapping buildings using drones.

BACKGROUND

Multi-level homes have multiple floors or levels with different layouts and configurations. These homes may also have varying configuration for transition between the different levels such as different shapes, sizes, forms, and sizes of staircases or elevator access points. The variations may impose a degree of complexity for mapping purposes (e.g., due to a spiral staircase with multiple turns).

SUMMARY

Innovative aspects of the subject matter described in this specification relate to mapping transition spaces in a multi-level building.

According to implementations described herein, a SCD may be used to map difficult transition spaces within buildings such as staircases between different levels of a multi-level building. The mapping technique used may vary based on the type of building space. For instance, for linear staircases, an orthogonal trajectory path or a smooth trajectory path may be used to map the transition space.

The orthogonal trajectory path and the smooth trajectory path may be derived, at least in part, on initial and terminating points provided by a user. The smooth trajectory path is a curved path connecting the initial and terminating points. The orthogonal trajectory path connects the initial and terminating points through two perpendicular paths intersecting at an intermediary point and extending from the initial and terminating points. For circular staircases, a user may move the drone from the initial point to the terminating point, and the drone may determine a trajectory path based on the user's movement of the drone from the initial point to the terminating point.

When the drone moves along the determined trajectory path, the drone may use its cameras and sensors to collect mapping data. The mapping data may include images of the environment along the trajectory path and data indicating the environmental conditions such as temperature, humidity, and pressure. The mapping data may be used to generate two or three-dimensional graphical representations of the mapped transition space.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
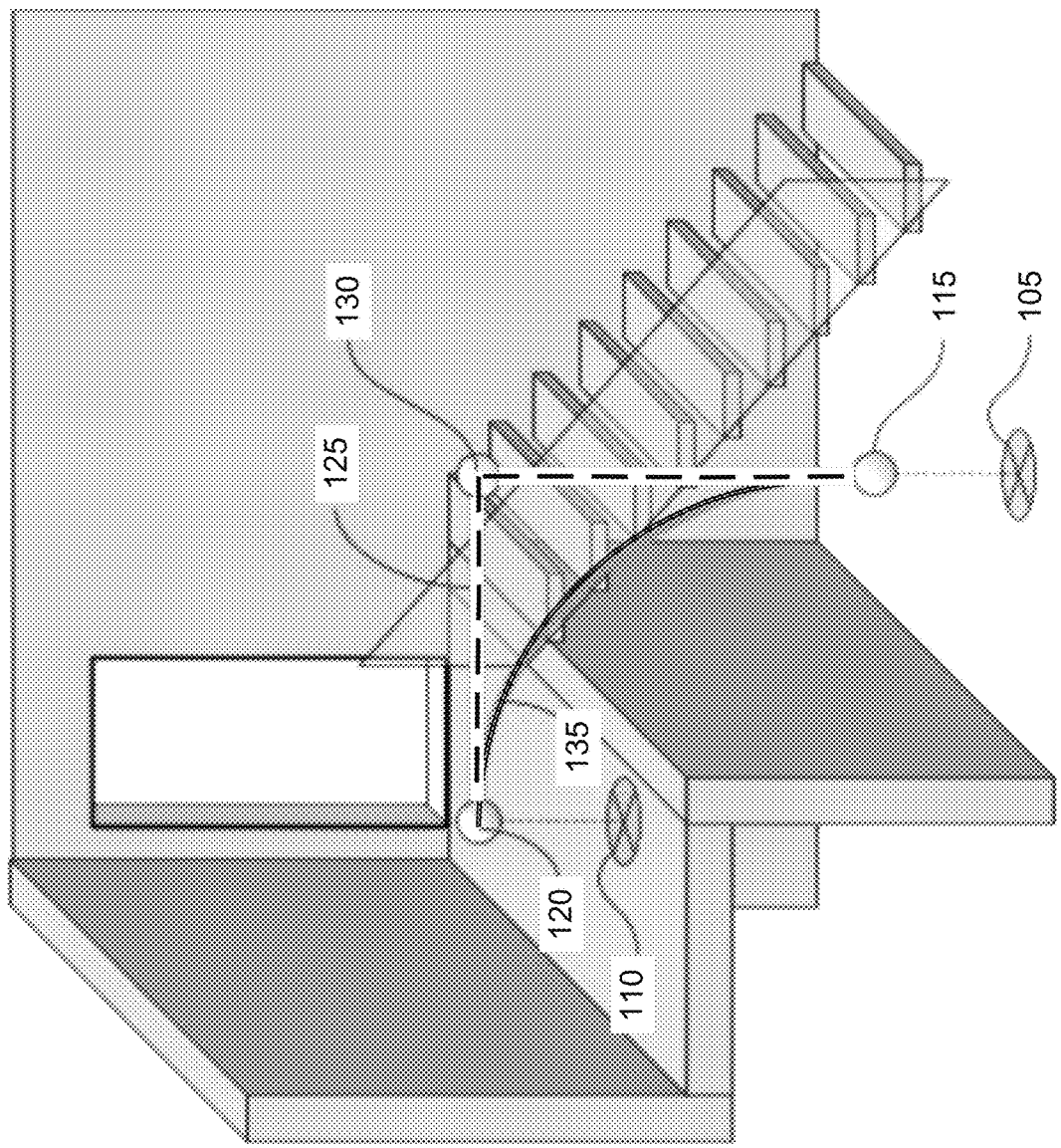
FIG. 1 depicts an example building space in a multi-level building unit.

Mapping of geographical zones can be beneficial for several reasons. For example, mapping a particular area allows a person, who is located remotely from the particular area, to view the layout, configuration, and other physical features and details of the particular area. Additionally, when mapping is applied to roads and cities, mapping allows computer systems and/or users to determine various routes that can be taken to navigate through the roads and cities. Similar advantages are available when mapping is performed indoors, e.g., within a building. For example, mapping a building space can allow a user to determine the most efficient way to get from one part of a building to another part or to visualize the space inside a building.

Mapping a particular area of a building may include capturing details regarding the particular area. The details may include environmental details (e.g., temperature, humidity, pressure details), physical details (e.g., walls, impediments, rooms hallways, furniture, decorations, ceilings, floors, doors, windows, etc.), and various other types of features present in the particular area. The mapping may be performed for various reasons, including, for example to perform mapping in response to a security alarm event.

Indoor mapping of buildings may however have certain constraints. For example, the presence of walls, furniture, elevators, and stairs, may impact the ability to effectively map an area as these elements may impact the ability of a mapper to access or move through the building. In addition, because building layouts have numerous different configurations and designs, it may be difficult to perform mapping in different building spaces.

The following figures and accompanying descriptions disclose implementations that describe how transition spaces in a building can be mapped. The descriptions refer to a user who may be a person or entity operating an autonomous security camera drone (SCD) or interested in mapping a building space.

In general, a SCD may refer to an unmanned aerial vehicle or device (UAV). A SCD may have one or more base stations which can be used to park the SCD and/or charge the SCD. The SCD may include one or more processors, a power unit that includes a battery chamber and a charging unit, a navigation unit, one or more engines or propulsion units, and one or more sensors. The one or more processors are configured to execute compute code, such as algorithms, that, when executed, help execute operations and action performed by the SCD as described in this specification. For example, a processor may execute code that facilitates movement of the SCD from one place to another. The processor may also include or be connected to a wireless communication unit that is configured to facilitate wireless communication between the SCD and other electronic devices.

The battery chamber in the power unit includes a receptacle to hold one or more batteries that provide power to the SCD when the SCD is not connected through a wired connection to a power source. The charging unit is configured to facilitate charging of the SCD. In some implementations, the charging unit may include a port that can wirelessly communicate with another device, such as a base station, for the wireless transfer of energy to charge the SCD in a wireless manner. In some implementations, the charging unit may include a port configured to provide a wired connection to a power source such as an electric wall outlet, battery charging device, or base station. The batteries of the SCD may then be charged by virtue of the connection provided through the charging unit.

The navigation unit is configured to facilitate movement of the SCD. The navigation unit may include a processor, as described above and below, and a location determining unit, e.g., a Global Positioning System (GPS) module, to determine the real-time location of the SCD. The navigation unit may include or be connected to an accelerometer, gyroscope, compass, altimeter, motion sensor, and any other suitable devices to determine the position, orientation, and/or movement of the SCD. In some implementations, the navigation unit may include a radar to determine a distance to one or more physical objects around the SCD.

The SCD may include or be connected to one or more sensors. In general, various types of sensors may be included or connected to the SCD. For example, the sensors may include, but are not limited to, optical sensors, light sensors, air sensors, pressure sensors, temperature sensors, humidity sensors, and motion sensors. In some implementation, the sensors may include a camera to acquire still or moving images, such as images of different spaces within a building.

Using a SCD to perform mapping may be advantageous because a SCD may move through vertical transitions between floors with ease and through horizontal spaces without significant deterrence from items such as furniture that rest on the floor. In addition, with information about a particular type of layout or configuration, a SCD may be programmed to perform mapping for all buildings or spaces that have the same type of layout or configuration. This improves the efficiency and time spent mapping buildings and transitions between levels in a building.

FIG. 1 illustrates an example building space 100 in a multi-level building. The depicted building space 100 has an open space layout with a lower level, an upper level, and a set of stairs providing a transition from the lower level to the upper level. Such a layout may, for example, be frequently used in loft-style apartments, homes, and open-concept office buildings.

In the example shown in FIG. 1, the user may be interested in mapping the transition from the lower level to the upper level, which is located at a higher elevation than the lower level. To initiate the mapping, a user may initiate a level transition recording through a graphical user interface on the user device, base station, or SCD. For instance, the user may open a building space mapping application and select a mapping recording option. In some implementations, the user may give the mapping a particular name, for example, "Linear Staircase Mapping," after selecting the mapping recording option or after the mapping has been completely recorded.

After initiating the recording, the user may select a point 105 in the lower level. In some implementations, to select the point 105, the user may physically move the SCD to the point 105 and indicate that the real-time position is the initial point on the lower level. In some implementations, the user may provide location coordinates of the initial point 105 through a graphical user interface on a user device, such as a computer or smart phone, that can wirelessly transmit the location coordinate information to the SCD or a base station (not shown) capable of providing instructions to the SCD. In some implementations, the user may provide location coordinates of the initial point 105 through a user interface of the base station. In some implementations, if the user is not personally aware of the location coordinates, the user may request the SCD or base station to determine the location coordinates of the initial point 105 after the user has moved the SCD to the initial point 105. The SCD and/or base station may use any location determining system, such as GPS, to determine the SCD's location coordinates.

The user may then walk up the stairs and select a terminating point 110 at a second location, e.g., upper level, having a different elevation than the elevation of the lower level. Upon reaching the terminating point 110, the user may select the terminating point 110 through any of the above-described techniques used to select point 105 on the lower level.

After receiving the selection of the initial point 105 and the terminating point 110, the SCD may store the location coordinates of the initial point 105 and the terminating point 110 in a memory. Although not shown in FIG. 1, the user may also select additional points 115, 120 as intermediary points and provide the location coordinates of the intermediary points 115, 120 in substantially the same manner used to provide the initial and terminating points 105, 110.

After location information regarding all the points is obtained, the SCD may determine which method to use to determine the mapping of the transition between the upper level and lower level. The method for determining the transition mapping includes, but is not limited to, a smooth trajectory method or an orthogonal trajectory method. In some implementations, the user may specify the type of method to use for determining the transition mapping by selecting the desired method through a graphical user interface on the user device, base station, or SCD. In some implementations, if the SDC is provided information on the type of building space being mapped, the SDC may determine the type of method to use for determining the transition mapping based on the type of building space being mapped. For example, the SDC may be programmed to use an orthogonal trajectory method when determining the transition mapping in an open space building configuration such as a loft apartment-type space. As another example, the SDC may be programmed to use a smooth trajectory method when determining the transition mapping along a curved staircase, which can often be found in buildings such as museums, palaces, mansions, and certain offices.

During pre-mapping operations described above, the user may hold the SCD and sensors in the SCD may sense the environment. For example, in some implementations, when user is moving the SCD from the initial point 105 to the terminating point 110, the SCD may perform additional operations such as scanning or taking videos or pictures of the surrounding environment.

In some implementations, the user may walk around the building from one room, floor, or location to another room, floor, or location until all the points of interests have been traversed. In some implementations, while the user is moving the SCD to the terminating point in the upper level, the SCD may record the trajectory that the SCD has moved during this pre-mapping phase and store it in the memory of the SCD or in another part of the monitoring system.

Based on the initial point, terminating point, any intermediary points, and the method for determining the transition mapping, the SCD may determine a level transition trajectory path between the initial point, terminating point, and any intermediary points. The SCD may build a two dimensional map, three dimensional map, or any other suitable graphical representation based on the data collected by sensors of the SCD.

In particular, if the transition mapping method is an orthogonal mapping (shown by the dotted line 125 in FIG. 1), the SCD may determine the trajectory path based on the initial point 115, the terminating point 120, any additional intermediary points, and a trajectory intermediate corner 130. The trajectory intermediate corner 130 may be determined based on the locations of the initial point 115 and the terminating point 120 and the direction between the initial point 115 and the second terminating point 120. For example, the initial point 115, the terminating point 120, and the trajectory intermediate corner point 130 may form a right triangle with the trajectory intermediate corner point 130 being the right angle corner.

If the transition mapping method is smooth mapping (shown by the solid line 135 in FIG. 1), SCD may determine the trajectory path based on the first intermediary point 115, the second intermediary point 120, and any additional intermediary points. Any trajectory path connects all the points and does not intersect with environment objects such as walls and other objects.

The SCD may then store trajectory path information including coordinates of the initial and terminating points, any intermediary points, and the determined trajectory path, along with any information regarding the building space received by the user and or the sensors built into the SCD. In some implementations, the trajectory path information may be stored as the default or preferred trajectory to be used to map a particular type of building space, e.g., an open configuration building space or a loft-type space.

To map the building space, the user may place the SCD at the initial point 105 or direct the SCD to move to the initial point 105 through a suitable graphical user interface on the SCD, base station, or user device. In some implementations, the user may place the SCD in another building space with the same or similar type of configuration/layout. The SCD may then move to the initial point 105 and begin mapping the building space according to the trajectory path without the user having to move the SCD from the initial point to the terminating point. The SCD may obtain the trajectory path information, initial point, terminating point, and intermediary points from a memory included or accessible to the SCD, and use the obtained information to perform the level transition mapping. In some implementations, the user may specify the type of trajectory path to use, for example, an orthogonal trajectory path or a smooth trajectory path, if both paths are available to be used for the building space to be mapped. In some implementations, the SCD may utilize the default trajectory path specified for the type of building space being mapped that is stored in memory.

In some implementations, when the SCD is moving along the trajectory (smooth or orthogonal) or when the user is moving the SCD from the initial point 105 to the terminating point 110, the SCD may perform additional operations such as scanning or taking videos or pictures of the surrounding environment. In general, various scanning techniques may be used to scan the environment such as laser-base scanning techniques. Optical images and videos obtained may also be used to generate floor plans and/or generate representations of the transition between the upper and lower levels. The SCD and may include additional sensors, such as temperature sensors and pressure sensors, to determine environmental conditions such as temperature, humidity, or pressure in the building space while performing the building space mapping operations.

In some implementations, a radar in the SCD may be used to ensure that the SCD maintains a particular distance, e.g., 1 meter, from the closest object or from the floor. For example, the radar may be used to determine the real time height of the SCD from the floor. Based on the real time height, the SCD may adjust its elevation to ensure that the particular distance is maintained from the floor. Similarly, the radar may be used to avoid collisions with objects that may be within the particular distance of the SCD as the SCD moves along the mapped trajectory or transition between different levels. The radar may be turned off when the SCD is being held by the user and moved from the initiating point to the terminating point.

In some implementations, the SCD may also be configured to generate a floor plan of the building space. Aspects of floor plan mapping and other aspects of multi-level mapping may employ one or more implementations described in in U.S. Patent Application No. 62/819,091, entitled PREMISE MAPPING WITH SECURITY CAMERA DRONE filed on Mar. 15, 2019, the contents of which are expressly incorporated by reference in their entirety. In some implementations, the floor plan may include a two dimensional representation, a three dimensional representation, or various other types of suitable representations. Mapping of a level transition, as described in this specification, may be one of the operations performed when mapping multiple floors of a building space.

Figure 2:
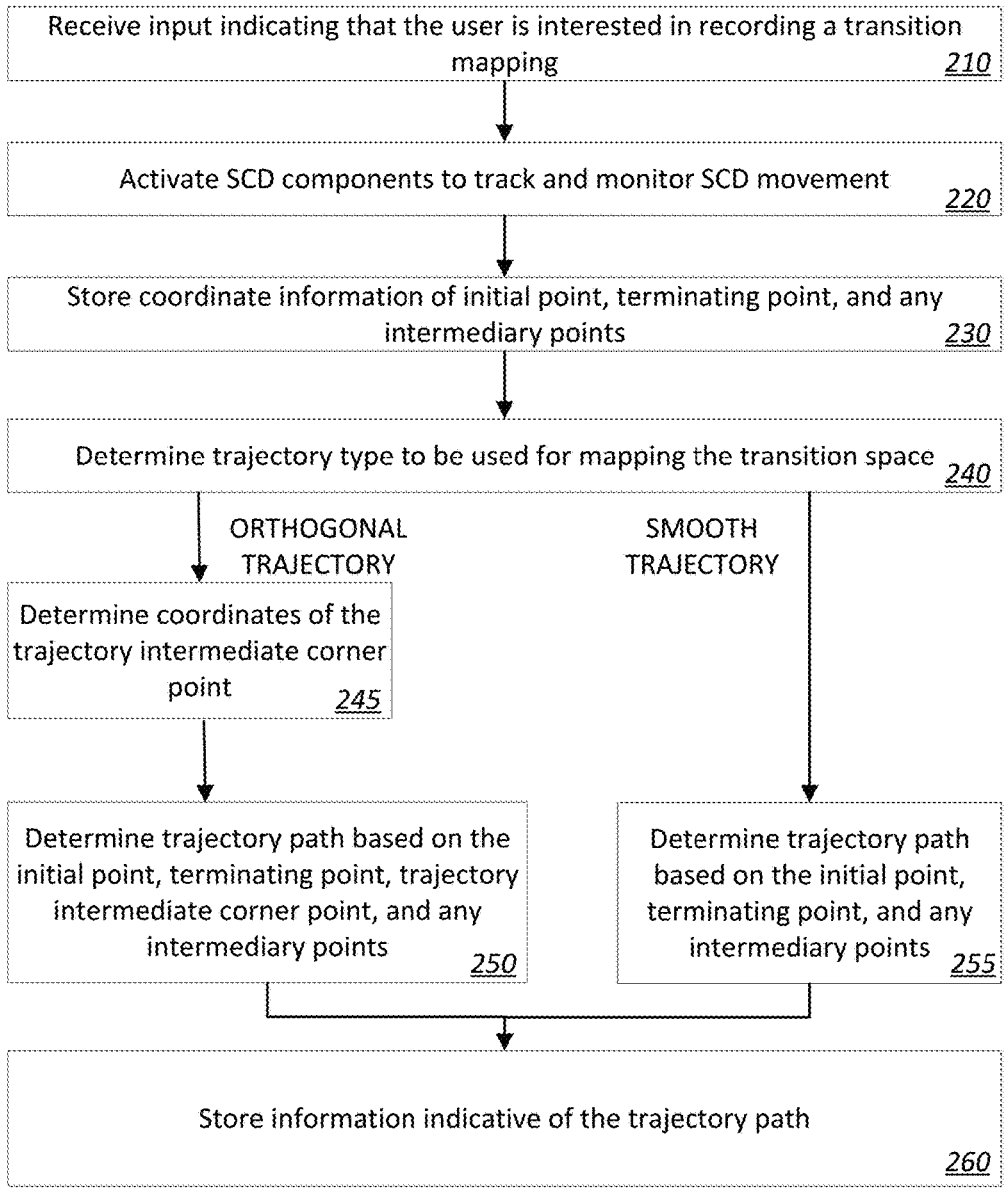
FIG. 2 depicts a flowchart of an example process to configure the SCD for mapping.

FIG. 2 depicts a flowchart of an example process 200 to configure the SCD for mapping. As described above, initially, the SCD may receive an indication directly through its graphical user interface or from a base station or user device that the user is interested in recording a transition mapping between the lower level and the upper level (210). The user device may be any electronic portable device capable of communicating with the SCD through a wired or wireless network and displaying a graphical user interface to receive user input and display notifications from the SCD or base station. Examples of the user device include, but are not limited to, a smart phone, a smart watch, a lap top, a desktop computer, and a personal digital assistant. In some implementations, a processor in the SCD may execute computer instructions and an application to display a graphical user interface to receive user input for commanding the SCD to perform various types of operations. These operations may include mapping buildings, floors, and/or transitions between the floors.

In response to receiving the indication that the user is interested in recording a transition mapping, the SCD activates its radars, navigation unit, sensors, and, more generally, any components that can track and monitor the movement of the SCD by the user (220). As part of the tracking, the SCD determines the physical coordinates of the initial point, terminating point, and any intermediate points as described above. The coordinate information may also be provided by the user through a user interface as described above. The physical coordinates may then be stored (230) in a memory integrated in the SCD or a memory that can directly or indirectly wirelessly communicate with the SCD.

Next, the SCD may determine the trajectory type to be used for mapping the transition space for which the SCD has stored physical coordinates of the initial point, terminating point, and any intermediate points (240). As described above, the SCD may make this determination by receiving data indicative of a user selection that identifies the type of trajectory to be used for mapping. In some implementations, images and data obtained prior to and/or when the user is moving the SCD from the initial point to the terminating point may be used to predict the type of building transition space to be mapped. For example, if the images taken indicate a linear stair case and floor plan data indicates that the transition space is not crowded with furniture or have walls, windows, or doors within a particular threshold distance, the SCD may determine that an open space is being mapped, and may select a smooth trajectory method or an orthogonal trajectory method. In some implementations, as explained in further detail below with respect to FIGS. 4 and 5, if the images taken indicate a curved or circular staircase, the SCD may determine that the transition path taken by the user should be used as the basis for the trajectory path.

In general, after the SDC obtains information on the type of building space being mapped, the SDC may determine the type of method to use for determining the transition mapping based on the type of building space being mapped. In general, various methods to map the transition space may be used. In some implementations, the methods may include an orthogonal trajectory method and a smooth trajectory method.

When the determined trajectory type is orthogonal, the SCD may determine the trajectory intermediate corner 130 based on coordinates of the initial point 115 and the terminating point 120 and the direction between the initial point 115 and the second terminating point 120, as described above (245). The trajectory path is then determined based on the coordinates of the first intermediary point 115, the second intermediary point 120, the trajectory intermediate corner 130, and any additional intermediary points (250). When the determined trajectory type is smooth, the SCD may determine the trajectory path based on coordinates of the first intermediary point 115, the second intermediary point 120, and any additional intermediary points (255).

After determining the trajectory path and additional data points such as the corner point required to determine the trajectory path, the SCD may store information indicative of the trajectory path including coordinates of the initial and terminating points, any intermediary points, and the determined trajectory path (260). In addition, additional information regarding the transition space provided by the user and/or obtained by the SCD may also be stored.

Coordinate and location information may be stored in various different formats. For example, in some implementations, coordinates may be determined and stored in a format suitable for use with GPS systems such that coordinate information can be used by various systems. In some implementations, the coordinate information may also be stored in a relative format such that the coordinate information is provided relative to a particular reference point in a building space. For example, coordinates of the initial and terminating points and any other points may be determined relative to a door (reference point) in the lower level or the first step (reference point) in the staircase. By storing coordinate information in a relativistic manner, the coordinates may be transferrable to different buildings with the same or similar configurations.

Figure 3:
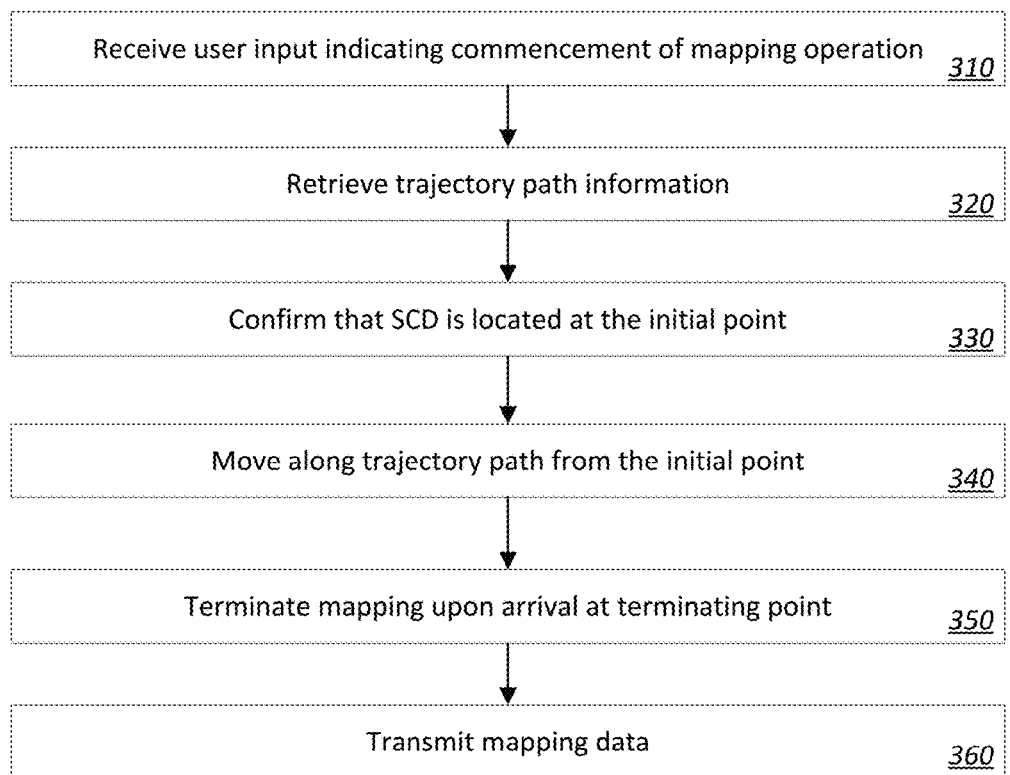
FIG. 3 depicts a flowchart of an example process to map a transition space using an orthogonal or smooth trajectory path.

FIG. 3 depicts a flowchart of an example process 300 to map a transition space using an orthogonal or smooth trajectory path.

After completing the operations shown in FIG. 2, a user may want to map building spaces having the same or similar configuration for which the user performed the operations in FIG. 2. The SCD may receive an input from the user through a graphical user interface indicating that the user would like to map a physical space (310). In some implementations, the user may also provide information regarding the type of physical space to be mapped or the type of trajectory path to be used for mapping purposes.

In response to receiving the user input, the SCD may retrieve the trajectory path information corresponding to the type of space it is located in or the type of space the user indicated the user would like the SCD to begin to map (320). For example, if the SCD is located in the same or similar building space in which the operations of FIG. 2 were performed, the SCD retrieves the trajectory path 260 information stored in operation. The trajectory path information may include data indicative of the type of path to be used for mapping, the coordinate location of the initial point, terminating point, and any intermediate points.

The SCD may then confirm that it is located at the initial point 105 (330). In some implementations, the SCD may be placed at the initial point 105 by the user or the navigation unit of the SCD may guide the SCD to move to the initial point 105. In some implementations, if relative coordinates are available, the SCD may first determine the location of the reference point in the building space first and subsequently determine the location of the initial point using the stored coordinate information relative to the reference point. The location of the reference point may be provided by the user or may be determined by determining a floor plan before mapping the transition space.

If the SCD determines that it is not at the initial point and/or cannot move to the initial point on its own, for example, due to a wall that may be located between its current location and the initial point, the SCD may output a message to the user to move it to the initial point. The SCD may then wait until it detects movement and can confirm that it is located at the initial point or can find a way to reach the initial point on its own.

Once the SCD confirms that it is located at the initial point, the SCD may begin to move along the trajectory path to the terminating point (340). While moving, the SCD may perform mapping and additional operations such as scanning or taking videos or pictures of the surrounding environment and determining environmental conditions as described above. The SCD may also use its radar and sensors to ensure that it maintains a particular path, elevation, and distance from objects to avoid collisions and continue along the trajectory path to the extent possible given the environment and any impediments along the trajectory path.

Upon arrival at the terminating point, the SCD may terminate its mapping operations (350) and transmit any information obtained during the mapping to the base station, user device, security system server, or any other device configured to receive mapping information from the SCD (360). The device receiving the mapping information may then process the mapping information to generate a 2-D, 3-D, or other suitable representation of the transition space between the upper level and the lower level. Along with the representation, the device may be able to provide graphical images or environmental data regarding the transition space.

Figure 4:
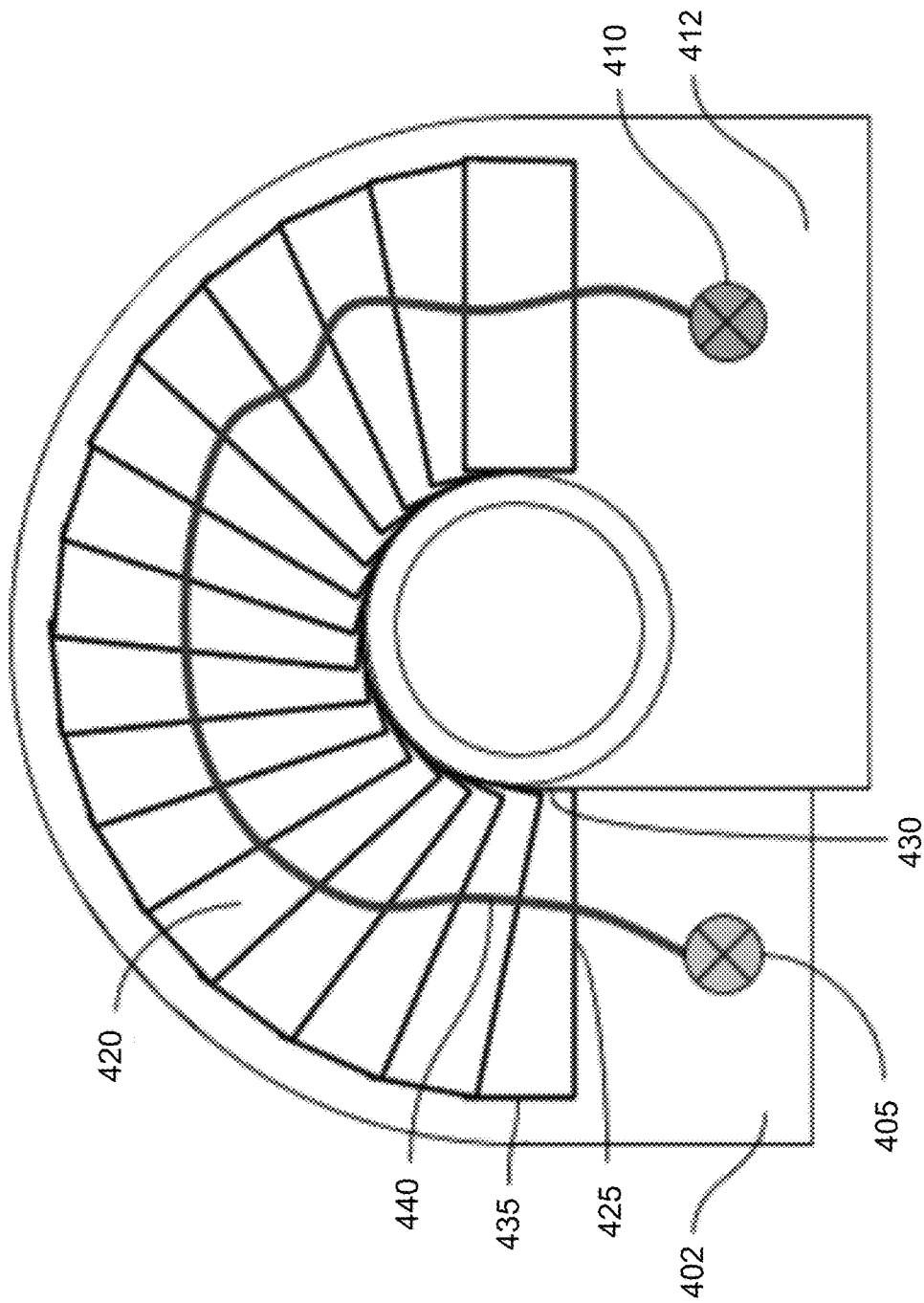
FIG. 4 depicts an example building space with a curved staircase in a multi-level building unit.

While FIGS. 1-3 describe examples of a building space with a linear staircase and relatively open-space configuration, other configurations of a building space are also possible. In some instances, building configurations and/or staircase designs may not allow the SCD to transition from one level to the other by following a trajectory through an open space and the SCD may have to fly in a more restricted three-dimensional space defined by the stairwell configuration. For example, FIG. 4 depicts an example building space 400 with a curved staircase in a multi-level building unit. As discussed in more detail below, such spaces may also be mapped using the implementations described herein.

FIG. 4 depicts a lower level 402, an upper level, 412, and a staircase 420 connecting the lower level 402 to the upper level 412. To initiate the mapping, a user may initiate a level transition recording through a graphical user interface on the user device, base station, or SCD. For instance, the user may open a building space mapping application and select a mapping recording option. In some implementations, the user may give the mapping a particular name, for example, "Curved Staircase Mapping," after selecting the mapping recording option or after the mapping has been completely recorded.

After initiating the recording, the user may select a point 405 in the lower level 402. In some implementations, to select the point 405, the user may physically move the SCD to the point 405 and indicate that the real-time position is the initial point 405 on the lower level 402. In some implementations, the user may provide location coordinates of the initial point 405 through a graphical user interface on a user device, such as a computer or smart phone, that can wirelessly transmit the location coordinate information to the SCD or a base station (not shown) associated with the SCD. In some implementations, the user may provide location coordinates of the initial point 405 through a user interface of the base station. In some implementations, if the user is not personally aware of the location coordinates, the user may request the SCD or base station to determine the location coordinates of the initial point 405 after the user has moved the SCD to the initial point 405. The SCD and/or base station may use any location determining system, such as GPS, to determine the SCD's location coordinates.

After selecting the initial point 405, the user may walk up the stairs 420 and select a terminating point 410 at a second location, e.g., upper level 412, having a different elevation than the elevation of the lower level 402. Upon reaching the terminating point 410, the user may select the terminating point 410 through any of the above-described techniques used to select the initial point 405 on the lower level 402. While the user is moving the SCD to the terminating point 410 in the upper level 412, the SCD may record the trajectory path 440 that the SCD has moved while being held by the user between the two levels 402 and 412.

After receiving the selection of the initial point 405 and the terminating point 410, the SCD may store the location coordinates of the initial point 405, the terminating point 410, and data indicative of the trajectory path 440 in a memory. Although not shown in FIG. 4, the user may also select additional points as intermediary points and provide the location coordinates of the intermediary points in substantially the same manner used to provide the initial and terminating points 405, 410.

The SCD may then determine a level transition trajectory path between the initial point 405, terminating point 415, any intermediary points based on the path 440 used by the user while moving the SCD from the initial point 405 to the terminating point 410. For example, the determined trajectory path may mimic the user's movement of the SCD at a particular height relative to the stairs and surrounding environment. Data indicative of the trajectory path 440 may be stored in the memory. In some implementations, the determined trajectory path information may be stored as the default or preferred trajectory to be used to map a particular type of building space, e.g., a curved staircase.

To map the transition space, the user may place the SCD at the initial point 405 or direct the SCD to move to the initial point 405 through a suitable graphical user interface on the SCD, base station, or user device. In some implementations, the user may place the SCD in another building space with the same or similar type of configuration/layout. The SCD may then move to the initial point 405 and begin mapping the building space according to the trajectory path 440 without the user having to move the SCD from the initial point to the terminating point. The SCD may obtain the trajectory path information, initial point, terminating point, and intermediary points from a memory included or accessible to the SCD, and use the obtained information to perform the level transition mapping. The SCD may utilize the default trajectory path specified for the type of building space being mapped that is stored in memory.

The SCD may use its radar, as described above, to ensure that it is at the correct elevation and distanced sufficiently from objects in the environment so that at least the initial portion of its trajectory can be completed without a collision at the correct elevation from the ground. The SCD may also use additional sensors and positional and orientation guiding devices such as gyroscopes, compasses, etc. to position itself as facing the edge 425 of the first step of the stairwell 420. In addition, the SCD may use sensors and cameras to detect the front edge 425, the outer edge 435, and the inner edge 430 of the first step and/or next several steps in the stairwell 420, and position itself facing perpendicularly to the front edge 425 between the outer edge 435 and the inner edge 430 of the first step.

After setting its initial position at the initiating point 405 of the trajectory, the SCD may advance up the stairs to the terminating point 410. The SCD may advance along the determined level transition trajectory path while using its sensors and radars as described above. The SCD may adjust its trajectory path based on any real-time data provided by the sensors and radar such as data that indicates that the SCD may collide with an object that has entered the determined trajectory path. In another example, the SCD may continuously adjust its orientation so that it is perpendicular to the front edge of a stair as the SCD advances upwards through the curved staircase 420. In another example, the SCD may perform scanning, take pictures or videos, and/or determine environmental conditions while moving along the trajectory path.

Upon arriving at the terminating point 410, the SCD may store mapping data obtained from the sensors and cameras at a memory located locally on the SCD or remotely, e.g., on the base station or server of a security system. The SCD may return to a default location (e.g., location of the base station) or the user may place the SCD at any location desired by the user. In some implementations, the user transport the SCD to other building spaces with the same or similar type of level transition configuration.

In some implementations, the SCD may also be configured to generate a floor plan of the building space. Aspects of floor plan mapping and other aspects of multi-level mapping may employ one or more implementations described in in U.S. Patent Application No. 62/819,091, entitled PREMISE MAPPING WITH SECURITY CAMERA DRONE filed on Mar. 15, 2019, the contents of which are expressly incorporated by reference in their entirety. In some implementations, the floor plan may include a two dimensional representation, a three dimensional representation, or various other types of suitable representations. Mapping of a level transition, as described in this specification, may be one of the operations performed when mapping multiple floors of a building space.

Figure 5:
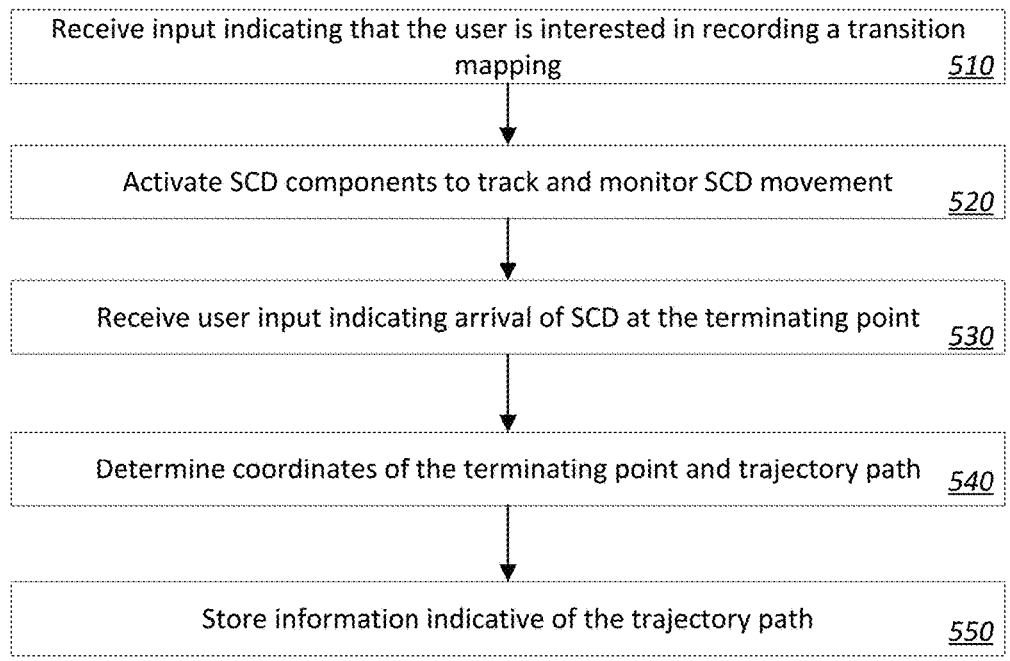
FIG. 5 depicts a flowchart of an example process to configure the SCD for mapping.

FIG. 5 depicts a flowchart of an example process 500 to configure the SCD for mapping a circular staircase as shown in FIG. 4. As described above, initially, the SCD may receive an indication directly through its graphical user interface or from a base station or user device that the user is interested in recording a transition mapping between the lower level and the upper level (510).

In response to receiving the indication that the user is interested in recording a transition mapping, the SCD activates its radars, sensors, and, more generally, any components that can track and monitor the movement of the SCD by the user (520). As part of the tracking, the SCD determines the physical coordinates of the initial point and the trajectory path taken by the user as described above. The coordinate information may also be provided by the user through a user interface as described above.

The SCD may receive an input from the user indicating that the user has arrived at the terminating point 410 (530). The SCD may then determine the physical coordinates of the terminating point 410, and points along the trajectory path taken by the user between the initial point 405 and the terminating point (540). In particular, the trajectory path may be determined using the physical coordinates of the initial point on the first level, the terminating point on the second level, and the physical coordinates of the trajectory path taken by the user above the staircase linking the first level to the second level.

The SCD may then store trajectory path information that includes physical coordinates of the initial and terminating points 405 and 410, any intermediary points, and the determined trajectory path 440 (550). The trajectory path information may be stored in a memory integrated in the SCD or a memory that can directly or indirectly wirelessly communicate with the SCD. In some implementations, the determined trajectory path information may be stored as the default or preferred trajectory to be used to map a particular type of building space, e.g., a curved staircase. Additional information regarding the transition space provided by the user and/or obtained by the SCD's sensors or radar may also be stored.

Coordinate and location information may be stored in various different formats. For example, in some implementations, coordinates may be determined and stored in a format suitable for use with GPS systems such that coordinate information can be used by various systems. In some implementations, the coordinate information may also be stored in a relative format such that the coordinate information is provided relative to a particular reference point in a building space. For example, coordinates of the initial and terminating points and any other points may be determined relative to a door (reference point) in the lower level or the first step (reference point) in the staircase. By storing coordinate information in a relativistic manner, the coordinates may be transferrable to different buildings with the same or similar configurations.

To map the transition space along the circular staircase, the SCD may execute the operations described in FIG. 3. However, instead of using an orthogonal or smooth trajectory path, the trajectory path used to perform mapping would be the trajectory path that is determined based on the user's movement as described above with respect to FIGS. 4 and 5.

Although some of the data processing steps have been described above as being performed by the SCD or the base station, in general, data processing may be performed on the SCD or in a location remote to the SCD. For example, the processing may occur at another component of a monitoring system and/or in the cloud to which the SCD is securely connected. For example, the SCD may be equipped with a communication circuit to communicate data directly to the cloud. Additionally or alternatively, the SCD may communicate the data to a server wirelessly connected to the base station, and the server may be configured to communicate the data to the cloud or another component of the monitoring system.

Additionally or alternatively, artificial intelligence and/or machine learning may be used to recognize, classify, and mark level transitions, rooms, walls, doors, other structures, furniture, etc. The generated level transition map may be validated and refined by other computing devices or by a human operator. If another system, such as a cloud-based system has information about the monitoring system at the property, such as locations of sensors and/or security zones, this information may be added to the level transition map. When the level transition map is generated and validated, the level transition map may be accessible to a user through a GUI, such as a web page, computer software GUI, or mobile application GUI.

The description hereinabove relates to implementations for mapping a transition space between a lower level and an upper level. However, the same implementations may be used to map transition spaces between an upper level and a lower level. Mapping in the reverse direction may be performed by setting the initial point at the upper level and the terminating point at the lower level and without the need to further modify the operations described hereinabove.

The operations of the SCD described above may be performed as part of a security monitoring system. For instance, the drone may perform the mapping of a transition space prior to providing audio and video security footage of the transition space. The mapping may also be used to provide visual guidance to remote assisters assisting with a security response to an alarm event occurring at a building which includes the transition space.

Figure 6:
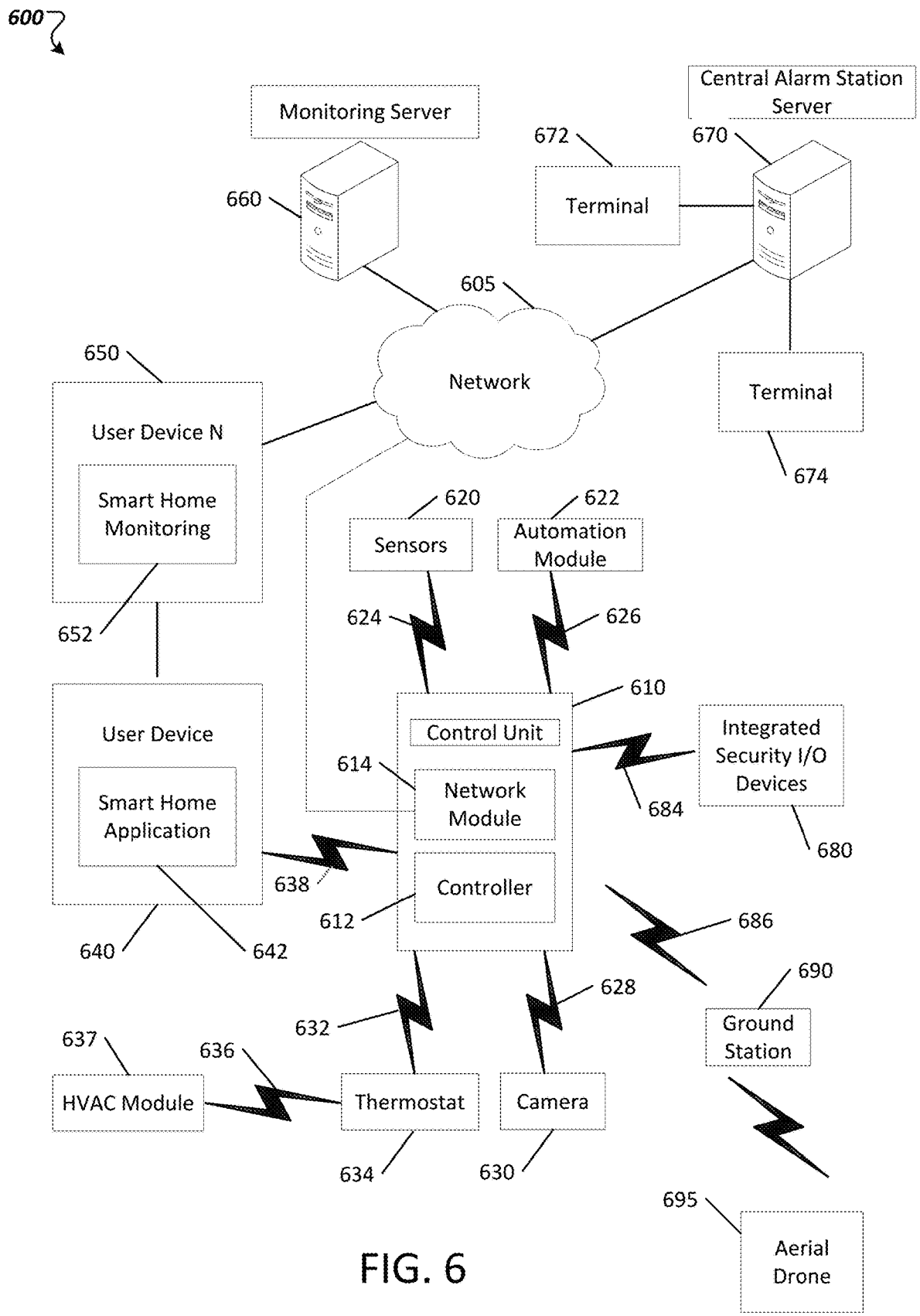
FIG. 6 depicts a block diagram of a security network system.

FIG. 6 illustrates a block diagram of an example security monitoring system 600. The monitoring system 600 includes a network 605, a control unit 610, one or more user devices 640, 650, a monitoring server 660, and a central alarm station server 670. In some examples, the network 605 facilitates communications between the control unit 610, the one or more user devices 640, 650, the monitoring server 660, and the central alarm station server 670. This example further includes a drone system that includes a base station 690 and an aerial drone 695 such as the SCD described above. In some implementations, the control unit 610 can communicate with the base station 690, the aerial drone 695, or both via a communication link 686 to provide event information such as an alarm event. The aerial drone 695 can be configured to launch based on receiving an alarm event and perform the mapping operations described above with respect to FIGS. 1-5.

The network 605 is configured to enable exchange of electronic communications between devices connected to the network 605. For example, the network 605 can be configured to enable exchange of electronic communications between the control unit 610, the one or more user devices 640, 650, the monitoring server 660, and the central alarm station server 670. The network 605 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 can include multiple networks or subnetworks, each of which can include, for example, a wired or wireless data pathway. The network 605 can include a circuit-switched network, a packet-switched data network, or any other network able to carry electronic communications (e.g., data or voice communications). For example, the network 605 can include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 can include one or more networks that include wireless data channels and wireless voice channels. The network 605 can be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 can include a processor or other control circuitry configured to execute instructions of a program that controls operation of a control unit system. In these examples, the controller 612 can be configured to receive input from sensors, flow meters, or other devices included in the control unit system and control operations of devices included in the household (e.g., speakers, lights, doors, etc.). For example, the controller 612 can be configured to control operation of the network module 614 included in the control unit 610.

The network module 614 is a communication device configured to exchange communications over the network 605. The network module 614 can be a wireless communication module configured to exchange wireless communications over the network 605. For example, the network module 614 can be a wireless communication device configured to exchange communications over a wireless data channel and a wireless voice channel. In this example, the network module 614 may transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also can be a wired communication module configured to exchange communications over the network 605 using a wired connection. For instance, the network module 614 can be a modem, a network interface card, or another type of network interface device. The network module 614 can be an Ethernet network card configured to enable the control unit 610 to communicate over a local area network and/or the Internet. The network module 614 also can be a voice band modem configured to enable the alarm panel to communicate over the telephone lines of Plain Old Telephone Systems (POTS).

The control unit system that includes the control unit 610 includes one or more sensors. For example, the monitoring system can include multiple sensors 620. The sensors 620 can include a lock sensor, a contact sensor, a motion sensor, or any other type of sensor included in a control unit system. The sensors 620 also can include an environmental sensor, such as a temperature sensor, a water sensor, a rain sensor, a wind sensor, a light sensor, a smoke detector, a carbon monoxide detector, an air quality sensor, etc. The sensors 620 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 can include a radio-frequency identification (RFID) sensor that identifies a particular article that includes a pre-assigned RFID tag.

The control unit 610 communicates with an automation module 622 and the camera 630 to perform monitoring. The automation module 622 is connected to one or more devices that enable home automation control. For instance, the automation module 622 can be connected to one or more lighting systems and can be configured to control operation of the one or more lighting systems. The automation module 622 can be connected to one or more electronic locks at the property and can be configured to control operation of the one or more electronic locks (e.g., control Z-Wave locks using wireless communications in the Z-Wave protocol. Further, the automation module 622 can be connected to one or more appliances at the property and can be configured to control operation of the one or more appliances. The automation module 622 can include multiple modules that are each specific to the type of device being controlled in an automated manner. The automation module 622 may control the one or more devices based on commands received from the control unit 610. For instance, the automation module 622 may cause a lighting system to illuminate an area to provide a better image of the area when captured by a camera 630.

The camera 630 can be a video/photographic camera or other type of optical sensing device configured to capture images. For instance, the camera 630 can be configured to capture images of an area within a building or within a residential facility 102-A monitored by the control unit 610. The camera 630 can be configured to capture single, static images of the area and also video images of the area in which multiple images of the area are captured at a relatively high frequency (e.g., thirty images per second). The camera 630 can be controlled based on commands received from the control unit 610.

The camera 630 can be triggered by several different types of techniques. For instance, a Passive Infra-Red (PIR) motion sensor can be built into the camera 630 and used to trigger the camera 630 to capture one or more images when motion is detected. The camera 630 also can include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the automation module 622, etc.) to improve image quality when the scene is dark. An integrated or separate light sensor can be used to determine if illumination is desired and may result in increased image quality.

The camera 630 can be programmed with any combination of time/day schedules, system "arming state," or other variables to determine whether images should be captured or not when triggers occur. The camera 630 may enter a low-power mode when not capturing images. In this case, the camera 630 may wake periodically to check for inbound messages from the controller 612. The camera 630 can be powered by internal, replaceable batteries if located remotely from the control unit 610. The camera 630 may employ a small solar cell to recharge the battery when light is available. Alternatively, the camera 630 can be powered by the controller's 612 power supply if the camera 630 is co-located with the controller 612.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634.

A HVAC module 637 is connected to one or more components of an HVAC system associated with a property, and is configured to control operation of the one or more components of the HVAC system. In some implementations, the HVAC module 637 is configured to monitor energy consumption of the HVAC system components, for example, by directly measuring the energy consumption of the HVAC system components or by estimating the energy usage of the one or more HVAC system components based on detecting usage of components of the HVAC system. The HVAC module 637 can communicate energy monitoring information and the state of the HVAC system components to the thermostat 634 and can control the one or more components of the HVAC system based on commands received from the thermostat 634.

The system 600 further includes one or more integrated security devices 680. The one or more integrated security devices can include any type of device used to provide alerts based on received sensor data. For instance, the one or more control units 610 may provide one or more alerts to the one or more integrated security input/output devices. Additionally, the one or more control units 610 may receive one or more sensor data from the sensors 620 and determine whether to provide an alert to the one or more integrated security input/output devices 680.

Devices such as the sensors 620, the automation module 622, the camera 630, the thermostat 634, and the integrated security devices 680 communicate with the controller 612 over communication links 624, 626, 628, 632, 684, and 686. The communication links 624, 626, 628, 632, 684, and 686 can be a wired or wireless data pathway configured to transmit signals from the sensors 620, the automation module 622, the camera 630, the thermostat 634, and the integrated security devices 680 to the controller 612. The sensors 620, the automation module 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 684, and 686 can include a local network. The sensors 620, the automation module 622, the camera 630, the thermostat 634, and the integrated security devices 680, and the controller 612 may exchange data and commands over the local network. The local network can include 602.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 6 (CAT5) or Category 6 (CAT6) wired Ethernet network. The local network can be a mesh network constructed based on the devices connected to the mesh network.

The monitoring server 660 is an electronic device configured to provide monitoring services by exchanging electronic communications with the control unit 610, the one or more user devices 640, 650, and the central alarm station server 670 over the network 605. For example, the monitoring server 660 can be configured to monitor events (e.g., alarm events) generated by the control unit 610. In this example, the monitoring server 660 may exchange electronic communications with the network module 614 included in the control unit 610 to receive information regarding events (e.g., alerts) detected by the central alarm station server 670. The monitoring server 660 also may receive information regarding events (e.g., alerts) from the one or more user devices 640, 650.

In some implementations, the monitoring server 660 may route alert data received from the network module 614 or the one or more user devices 640, 650 to the central alarm station server 670. For example, the monitoring server 660 may transmit the alert data to the central alarm station server 670 over the network 605. The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640, 650.

The central alarm station server 670 is an electronic device configured to provide alarm monitoring service by exchanging communications with the control unit 610, the one or more user devices 640, 650, and the monitoring server 660 over the network 605. For example, the central alarm station server 670 can be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640, 650 and/or the monitoring server 660.

The central alarm station server 670 is connected to multiple terminals 672 and 674. The terminals 672 and 674 can be used by operators to process alerting events. For example, the central alarm station server 670 may route alerting data to the terminals 672 and 674 to enable an operator to process the alerting data. The terminals 672 and 674 can include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a motion detection from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 can be mobile devices or devices designed for a specific function. Although FIG. 6 illustrates two terminals for brevity, actual implementations can include more (and, perhaps, many more) terminals. The one or more user devices 640, 650 are devices that host and display user interfaces. For instance, the user device 640 is a mobile device that hosts one or more native applications (e.g., the smart home application 642). The user device 640 can be a cellular phone or a non-cellular locally networked device with a display. The user device 640 can include a cell phone, a smart phone, a tablet PC, a personal digital assistant ("FDA"), or any other portable device configured to communicate over a network and display information. For example, implementations may also include mobile communication devices, tablets, electronic organizers, portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Google Android, Windows Mobile, etc. The smart home application 642 enables the user device 640 to receive and process image and sensor data from the monitoring system. The smart home application 642 may include a transition space mapping application described above through which the user may interact with a graphical user interface and provide inputs for performing the mapping operations.

The user device 650 can be a general-purpose computer (e.g., a desktop personal computer, a workstation, or a laptop computer) that is configured to communicate with the monitoring server 660 and/or the control unit 610 over the network 605. The user device 650 can be configured to display a smart home user interface 652 that is generated by the user device 650 or generated by the monitoring server 660. For example, the user device 650 can be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations can include more (and, perhaps, many more) or fewer user devices.

In some implementations, the one or more user devices 640, 650 communicate with and receive monitoring system data from the control unit 610 using the communication link 638. For instance, the one or more user devices 640, 650 may communicate with the control unit 610 using various local wireless protocols such as Wi-Fi, Bluetooth, Zwave, ZigBee, HomePlug (Ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring server 660) can be significantly slower.

Although the one or more user devices 640, 650 are shown as communicating with the control unit 610, the one or more user devices 640, 650 may communicate directly with the sensors 620 and other devices controlled by the control unit 610. In some implementations, the one or more user devices 640, 650 replace the control unit 610 and perform the functions of the control unit 610 for local monitoring and long range/offsite communication.

In other implementations, the one or more user devices 640, 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640, 650 through the network 605. In this regard, the monitoring server 660 may facilitate communication between the one or more user devices 640, 650 and the monitoring system.

In some implementations, the one or more user devices 640, 650 can be configured to switch whether the one or more user devices 640, 650 communicate with the control unit 610 directly (e.g., through link 638) or through the monitoring server 660 (e.g., through network 605) based on a location of the one or more user devices 640, 650. For instance, when the one or more user devices 640, 650 are located close to the control unit 610 and in range to communicate directly with the control unit 610, the one or more user devices 640, 650 use direct communication. When the one or more user devices 640, 650 are located far from the control unit 610 and not in range to communicate directly with the control unit 610, the one or more user devices 640, 650 use communication through the monitoring server 660.

In some implementations, the one or more user devices 640, 650 are used in conjunction with local sensors and/or local devices in a house. In these implementations, the system 600 includes the one or more user devices 640, 650, the sensors 620, the automation module 622, and the camera 630. The one or more user devices 640, 650 receive data directly from the sensors 620, the automation module 622, and the camera 630, and send data directly to the sensors 620, the automation module 622, and the camera 630. The one or more user devices 640, 650 provide the appropriate interfaces/processing to provide visual surveillance and reporting. In some implementations, the system 600 provides end users with access to images captured by the camera 630 to aid in decision making. The system 600 may transmit the images captured by the camera 630 over a wireless WAN network to the user devices 640, 650.

In some implementations, a state of the monitoring system and other events sensed by the monitoring system can be used to enable/disable video/image recording devices (e.g., the camera 630). In these implementations, the camera 630 can be set to capture images on a periodic basis when the alarm system is armed in an "Away" state, but set not to capture images when the alarm system is armed in a "Stay" state or disarmed. In addition, the camera 630 can be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images can be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one or more of the operations may be performed by the smart meter or other network components.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," or "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure. Thus, particular implementations have been described. Other implementations are within the scope of the following claims. For example, the actions recited in the claims may be performed in a different order and still achieve desirable results.

What is claimed is:

1. A system comprising:
   a drone comprising at least one sensor; and
   one or more processors and one or more storage devices storing instructions that are operable, when executed by the one or more processors, to cause the one or more processors to perform operations comprising:
   receiving data indicative of an instruction to obtain mapping data between an initial point on one level of a building and a terminating point on a second level different than the one level of the building, a path between the initial point and the terminating point comprising a curved staircase having a plurality of horizontal front edges including a first horizontal front edge that is not parallel to a second horizontal front edge in the curved staircase, wherein the data indicative of the instruction to obtain the mapping data between the initial point and the terminating point was generated from input for a graphical user interface;

detecting, using the at least one sensor and from the plurality of horizontal front edges and after the drone aligned a horizontal orientation of the drone with the first horizontal front edge, the second horizontal front edge that is not parallel to the first horizontal front edge in the curved staircase;

controlling, using the data from the detection of the second horizontal front edge, a position and the horizontal orientation of the drone such that a heading direction of the drone is substantially perpendicular to the second horizontal front edge in the curved staircase;

capturing, when the drone is traversing at least a portion of the curved staircase while moving from the initial point to the terminating point, the mapping data comprising sensor data from the at least one sensor; and storing the mapping data in memory for use after the drone terminates capturing of the mapping data when a terminating criterion is satisfied.

2. The system of claim 1, wherein the path was selected as a trajectory path specified for a type of building space being mapped and that is stored in a memory of the system.

3. The system of claim 1, wherein:
the path is a smooth trajectory path.

4. The system of claim 1, wherein detecting the second horizontal front edge in the curved staircase using the at least one sensor comprises:

detecting the second horizontal front edge, an outer edge, and an inner edge of a corresponding step in the curved staircase, the second horizontal front edge extending between the inner edge and the outer edge.

5. The system of claim 1, wherein the operations comprise:

obtaining real-time data indicative of environmental conditions along the path and an object that is present in the path; and controlling the drone to avoid a collision with the object.

6. The system of claim 1, the operations comprise:
determining that the drone is located at the terminating point; and terminating the capturing of the mapping data in response to determining that the drone is located at the terminating point.

7. A computer-implemented method, comprising:
receiving data indicative of an instruction to obtain mapping data between an initial point on one level of a building and a terminating point on a second level different than the one level of the building, a path between the initial point and the terminating point comprising a curved staircase having a plurality of horizontal front edges including a first horizontal front edge that is not parallel to a second horizontal front edge in the curved staircase, wherein the data indicative of the instruction to obtain the mapping data between the initial point and the terminating point was generated from input for a graphical user interface;

detecting, using at least one sensor and from the plurality of horizontal front edges and after a drone aligned a horizontal orientation of the drone with the first horizontal front edge, the second horizontal front edge that is not parallel to the first horizontal front edge in the curved staircase;

controlling, using the data from the detection of the second horizontal front edge, a position and the horizontal orientation of the drone such that a heading direction of the drone is substantially perpendicular to the second horizontal front edge in the curved staircase;

capturing, when the drone is traversing at least a portion of the curved staircase while moving from the initial point to the terminating point, the mapping data comprising sensor data from the at least one sensor; and storing the mapping data in memory for use after the drone terminates capturing of the mapping data when a terminating criterion is satisfied.

8. The computer-implemented method of claim 7, wherein the path was selected as a trajectory path specified for a type of building space being mapped and that is stored in a memory of a system.

9. The computer-implemented method of claim 7, wherein:
the path is a smooth trajectory path.

10. The computer-implemented method of claim 7, detecting the second horizontal front edge in the curved staircase using the at least one sensor comprises:

detecting the second horizontal front edge, an outer edge, and an inner edge of a corresponding step in the curved staircase, the second horizontal front edge extending between the inner edge and the outer edge.

11. The computer-implemented method of claim 7, comprising:

obtaining real-time data indicative of environmental conditions along the path and an object that is present in the path; and controlling the drone to avoid a collision with the object.

12. The computer-implemented method of claim 7, comprising:

determining that the drone is located at the terminating point; and terminating the capturing of the mapping data in response to determining that the drone is located at the terminating point.

13. A non-transitory computer-readable storage medium comprising instructions, which, when executed by one or more computer processors, cause the one or more computer processors to perform operations comprising:

receiving data indicative of an instruction to obtain mapping data between an initial point on one level of a building and a terminating point on a second level different than the one level of the building, a path between the initial point and the terminating point comprising a curved staircase having a plurality of horizontal front edges including a first horizontal front edge that is not parallel to a second horizontal front edge in the curved staircase, wherein the data indicative of the instruction to obtain the mapping data between the initial point and the terminating point was generated from input for a graphical user interface;

detecting, from the plurality of horizontal front edges and after a drone aligned a horizontal orientation of the drone with the first horizontal front edge, the second horizontal front edge in the curved staircase using at least one sensor, wherein the detecting comprising:

detecting the second horizontal front edge, an outer edge, and an inner edge of a corresponding step in the curved staircase, the second horizontal front edge extending between the inner edge and the outer edge;

controlling, using the data from the detection of the second horizontal front edge, a position and the horizontal orientation of the drone such that a heading direction of the drone is substantially perpendicular to the second horizontal front edge in the curved staircase;

capturing, when the drone is traversing at least a portion of the curved staircase while moving from the initial point to the terminating point, the mapping data comprising sensor data from the at least one sensor; and storing the mapping data in memory for use after the drone terminates capturing of the mapping data when a terminating criterion is satisfied.

14. The non-transitory computer-readable storage medium of claim 13, wherein:

the path is a smooth trajectory path.

15. The non-transitory computer-readable storage medium of claim 13, wherein the operations comprise:

obtaining real-time data indicative of environmental conditions along the path and an object that is present in the path; and controlling the drone to avoid a collision with the object.

16. The non-transitory computer-readable storage medium of claim 13, the operations comprise:

determining that the drone is located at the terminating point; and terminating the capturing of the mapping data in response to determining that the drone is located at the terminating point.

* * * * *